(12) United States Patent
Gerber et al.

(10) Patent No.: US 6,765,307 B2
(45) Date of Patent: Jul. 20, 2004

(54) WAVE ENERGY CONVERTER (WEC)

(75) Inventors: James Gerber, Princeton, NJ (US);
George W. Taylor, Princeton, NJ (US);
Thomas R. Welsh, Princeton, NJ (US)

(73) Assignee: Olean Power Technologies, Inc.,
Pennington, NJ (US)

(*) Notice: Subject to any disclaimer, the term of this patent is extended or adjusted under 35 U.S.C. 154(b) by 65 days.

(21) Appl. No.: 10/047,768

(22) Filed: Jan. 15, 2002

(65) Prior Publication Data

US 2003/0001392 A1 Jan. 2, 2003

Related U.S. Application Data

(60) Provisional application No. 60/261,941, filed on Jan. 16, 2001.

(51) Int. Cl.[7] .......................... F03B 13/10; F03B 13/12; F03B 13/00; H02P 9/04
(52) U.S. Cl. ............................ 290/42; 290/43; 290/53; 290/54
(58) Field of Search .............................. 290/43, 42, 53, 290/54; 60/398, 496; 405/75, 76; 417/332, 53

(56) References Cited

U.S. PATENT DOCUMENTS

| | | | |
|---|---|---|---|
| 4,076,463 A | * 2/1978 | Welczer | 417/331 |
| 4,277,690 A | * 7/1981 | Noren | 290/53 |
| 4,355,511 A | * 10/1982 | Jones | 60/507 |
| 4,421,461 A | * 12/1983 | Hicks et al. | 417/53 |
| 4,754,157 A | * 6/1988 | Windle | 290/53 |
| 4,773,221 A | * 9/1988 | Noren | 60/501 |
| 4,883,411 A | * 11/1989 | Windle | 417/331 |
| 5,548,177 A | * 8/1996 | Carroll | 310/339 |
| 5,701,740 A | * 12/1997 | Tveter | 60/505 |
| 6,020,653 A | * 2/2000 | Woodbridge et al. | 290/53 |
| 6,205,405 B1 | * 3/2001 | Pouvreau | 702/41 |
| 6,226,989 B1 | * 5/2001 | Fredriksson et al. | 60/501 |
| 6,229,225 B1 | * 5/2001 | Carroll | 290/53 |
| 6,300,689 B1 | * 10/2001 | Smalser | 290/43 |
| 6,392,314 B1 | * 5/2002 | Dick | 290/53 |

* cited by examiner

Primary Examiner—Nicholas Ponomarenko
Assistant Examiner—Julio Gonzalez R.
(74) Attorney, Agent, or Firm—Henry I. Schanzer

(57) ABSTRACT

A wave energy converter (WEC), for use in a body of water of depth Dw, includes a tubular structure and a piston within the tubular structure where the relative motion between the piston and the tubular structure is used to generate electric power. The length (L) of the tubular structure may be selected to have a predetermined value based on the fact that: (a) the efficiency of the power generated by WEC increases as the length "L" of the tubular structure increases from a minimal value until L reaches an optimal value; and (b) the efficiency decreases as L is increased beyond the optimal value due to the increased mass of the water that the tubular structure and the piston have to move.

24 Claims, 17 Drawing Sheets

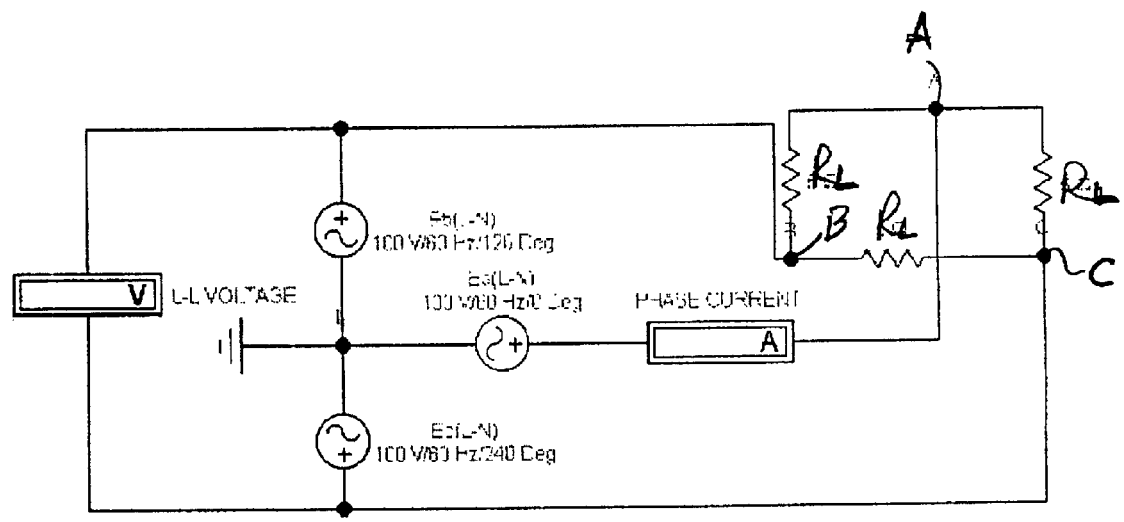
Figure 3  Three φ Generator, Δ Connected Load

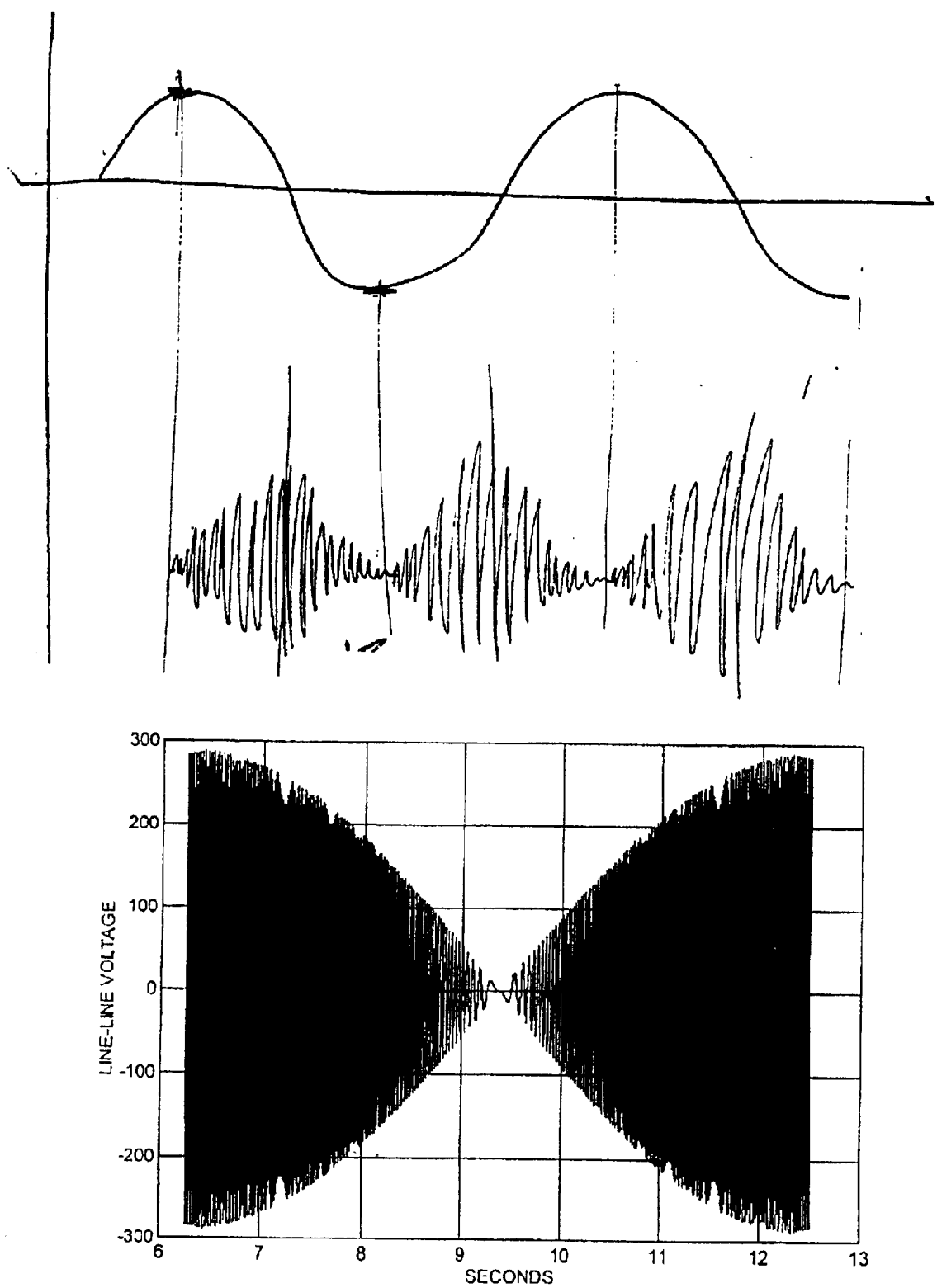
Figure 4 Modulated Generator Voltage

Figure 7. Generator Load Configuration

FIG 8 – ELECTRO-MECHANICAL EQUIVALENT CIRCUIT

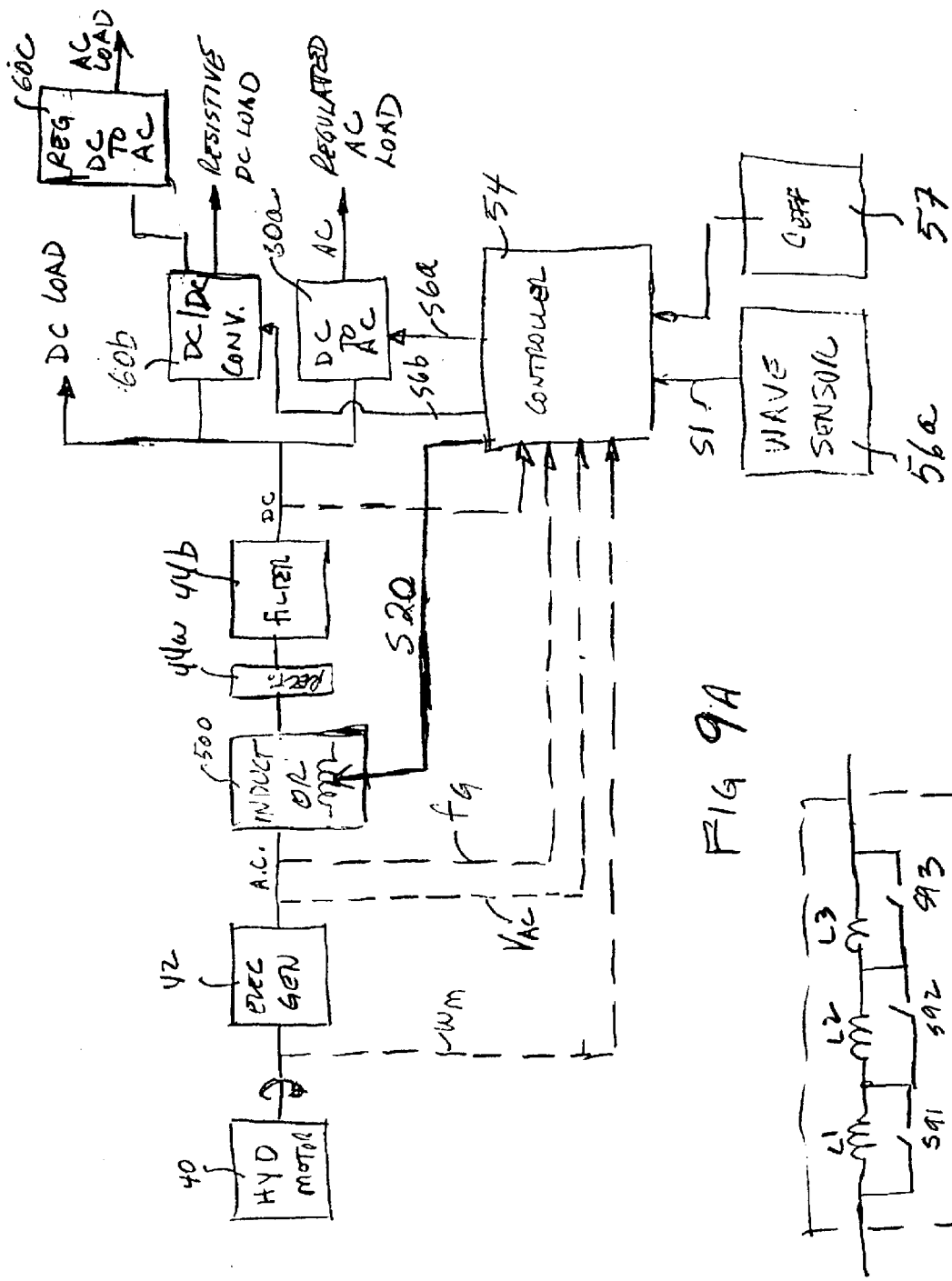

Effective Wave Height vs. Frequency (Period)

WAVE ENERGY CONVERTER (WEC)

This application claims priority based on a provisional application titled "IMPROVED WAVE ENERGY CONVERTER (WEC)" filed on Jan. 16, 2001 and bearing S/No. 60/261,941.

This invention relates to the conversion of energy from naturally occurring sources of mechanical energy, such as the mechanical energy present in ocean surface waves, to electrical energy. This invention also relates to the efficient production of the electrical energy and the transfer of that energy.

Various wave energy converter (WEC) systems are known. For example, reference is made to U.S. patent application Ser. No. 09/379,421 filed Aug. 21, 1999, titled "Wave Energy Converter Utilizing Pressure Differences", and to U.S. patent application Ser. No. 09/922,877 filed Aug. 6, 2001, titled "Apparatus And Method For Optimizing The Power Transfer Produced By A Wave Energy Converter (WEC)", both assigned to the assignee of the present application and the teachings of which are incorporated herein by reference and/or explicitly.

Numerous problems exist in the design of a mechanical system for harnessing the energy contained in ocean waves. Particularly, a problem exists in harnessing the energy efficiently. Furthermore, the problem includes determining criteria for certain physical characteristics of the structure and system to ensure that the energy contained in ocean waves is harnessed most efficiently and what should be done to optimize the power generated and the power transferred.

SUMMARY OF THE INVENTION

Applicants' invention resides, in part, in the recognition that the efficiency of a wave energy converter (WEC) which includes a tubular structure and a piston within the tubular structure where the relative motion between the piston and the tubular structure is used to generate electric power may be optimized by limiting the length (L) of the tubular structure to certain values. In accordance with the prior art, the length of the tubular structure was made as long as possible for a given water depth, Dw. However, Applicants discovered that this should not be the case. Applicants recognized that: (a) the efficiency of the power transfer from the input wave to the output of the generator increases as the length "L" of the tubular structure increases from a minimal value until L reaches an optimal value; and (b) the efficiency decreases as L is increased beyond the optimal value due to the increased mass of the water that the tubular structure and the piston have to move.

Where the WEC is intended for use in a body of water having a water depth (Dw), with peak-to-peak wave heights of H, and where the waves have a wavelength of $\lambda$, the length L of the tubular structure may be expressed as a function of Dw and $\lambda$.

In the case of a cylinder, the optimum value of L of the tubular section can be found by determining the solution of L as set forth below.

$$L_{OPT} = \frac{1 - \cosh(2\pi L_{OPT}/\lambda) + \tanh(2\pi D_w/\lambda)\sinh(2\pi L_{OPT}/\lambda)}{(4\pi/\lambda)\sinh(2\pi L_{OPT}/\lambda) + (4\pi/\lambda)\tanh(2\pi D_w/\lambda)\cosh(2\pi L_{OPT}/\lambda)}$$

Alternatively, the optimum value of L of the tubular section may be obtained from calculations for the power output of the system as a function of the length of the tubular section for a given depth Dw of the body of water. The calculations indicate that as the length of the tubular section increases from zero to a value equal to the depth Dw of the body of water, the power output increase to an optimal value and then decreases. The results indicate that there is a shallow peak, whereby a power output of approximately 90% of the peak value may be obtained for values of L ranging between 0.3Dw and 0.6Dw. In addition, for "deep water" condition (where Dw/$\lambda$>⅓), L may be a function of $\lambda$. For example, L may be equal to 0.2$\lambda$.

These results enable the designer to select the most attractive length of the tubular section with due consideration for the power output and the cost of the system; since typically the cost of the WEC increases as its length increases.

BRIEF DESCRIPTION OF THE DRAWINGS

In the accompanying drawing like reference characters denote like components.

FIG. 3 is a simplified schematic diagram of a three-phase generator, driven by a motor contained within a WEC, for the application thereto of an optimum load in accordance with the invention;

FIG. 4 is a waveform diagram illustrating the heavy modulation of the generator output voltage;

FIG. 9A is another block diagram of a system embodying the invention;

FIG. 9B is a diagram of an inductor network suitable for use in practicing the invention;

DETAILED DESCRIPTION OF THE INVENTION

To better explain the invention, reference will first be made to the simplified diagrams of various WEC structures shown in FIGS. 1 and 2A.

Figure 1:
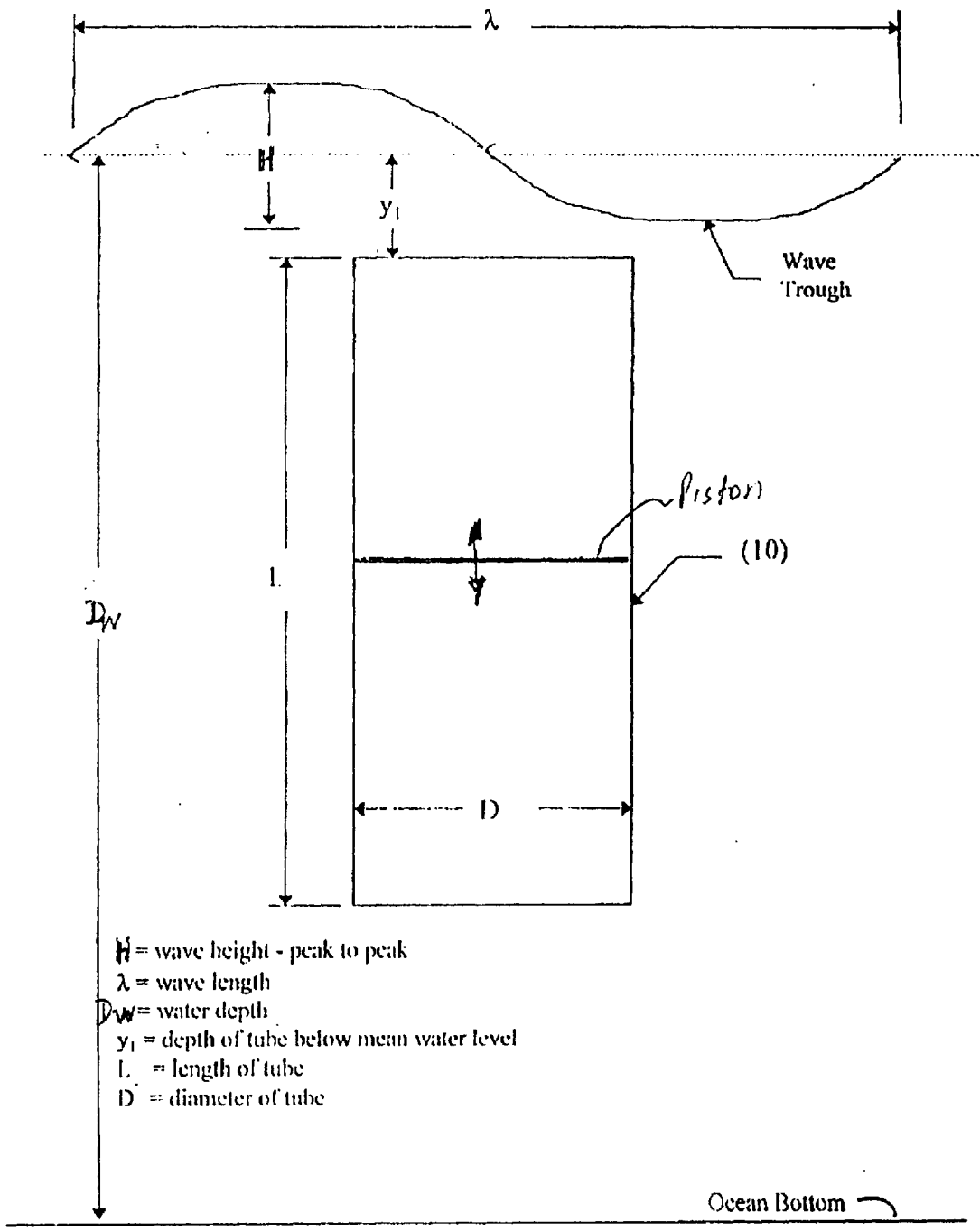
FIG. 1 is a sketch of a tubular wave energy converter (WEC) system with a piston deployed in a body of water for capturing energy from ocean waves and which may be used to practice the invention.

FIG. 1 is a sketch for identifying various relevant dimensional parameters of a system which may be used to practice the invention deployed in a body of water. FIG. 2A is a cross-section of a WEC identifying certain of their key elements which are used to practice the invention.

This invention teaches and shows: (a) that various portions of a mechanical, hydraulic, electromechanical and electrical subsystems may be represented by a single electrical equivalent circuit which may be used for further development of the system; (b) the development of a mathematical model to characterize a buoy system, and more particularly, a WEC; (c) a method of extracting electrical power from the WEC; (d) apparatus and methods to optimize power transfer from the WEC to a load; and (e) that the length (L) of the buoy (i.e., the tubular structure) may have an optimum range of values.

Thus, the invention resides, in part, in recognizing and determining which factors are important in ascertaining the length of a buoy and how to determine an optimal value of buoy length as a function of water depth (Dw) and the length of the waves operating on the buoy. The invention also resides, in part, in identifying the relationship between a buoy power generation system and the electrical loading on the system. For ease of illustration, in the discussion to follow, reference and assumptions are made which apply specifically to a cylindrically (tubular with piston) shaped WEC of the type shown in FIGS. 1 and 2A. However, it should be understood that the invention is applicable to other structures used to convert naturally occurring and recurring forces into electrical energy.

1.0 System Differential Equation

Figure 2A:
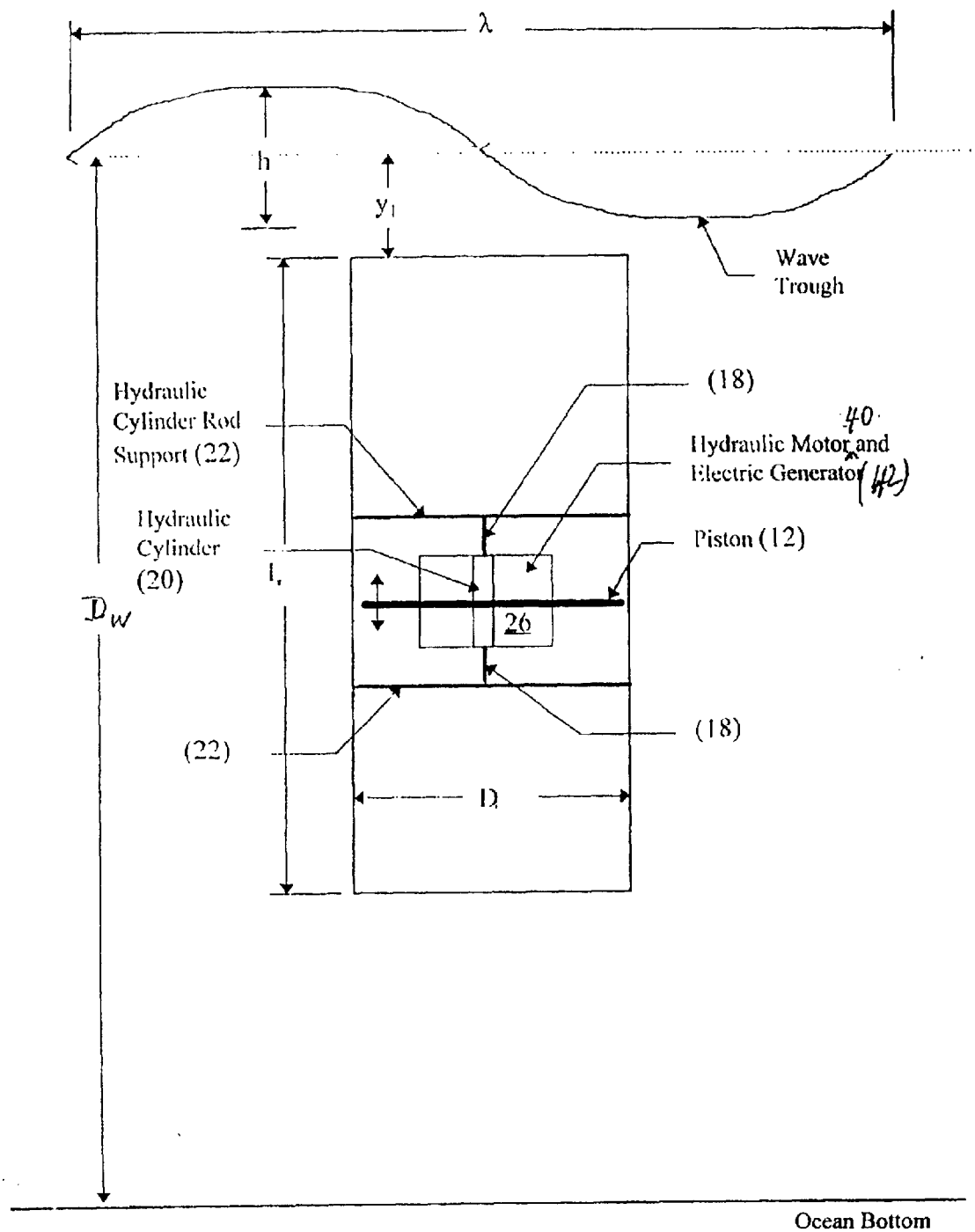
FIG. 2A is a cross section of a WEC which may be used to practice the invention.

Referring to FIGS. 1 and 2A, the basic WEC buoy differential equation is, by balance of forces, given by $$F_{IN} \sin \omega t = M_{WC} \partial V_P/\partial t + F_C \quad (1)$$

Where:

$V_P$ is the piston velocity:

$F_{IN}$ is the differential force applied to the shell by the ocean wave;

Mwc is the mass of the water in the WEC and is equal to the volume of the WEC tube multiplied by the density of water;—Note: that this is a simplification and that, to be more exact, the term Mwc should include the mass of other components such as the mass of the tube itself and an "added mass" term used to account for the mass of the water around the WEC being moved. As used herein and in the appended claims the term MT is meant to include all these masses. However, where Mwc is much greater than any other term, the other terms may be omitted when making an approximate calculation.

$M_{WC} \partial V_P/\partial t$ is the acceleration of the water within the buoy; and $F_C$ is the counter force exerted back on the piston as electrical power is extracted from the load.

This latter term (Fc) is highly significant since it represents the electro-mechanical coupling force between generator power extraction and the mechanical motion of the buoy.

Rewriting equation (1) in terms of the system parameters, we obtain in the case of a resistive load $$\rho g A H \delta/2[\sin \omega t] = \rho A L \partial V_P/\partial t + F_C = \rho A L \partial V_P/\partial t + K_G K_T V_P/(R_L r_0^2) \quad (2)$$

where:

$\rho$=mass density of water, g=gravity,

A=the cross sectional area of the buoy projected onto a plane parallel to the undisturbed surface of the water. In general, A is equal to the cross sectional area of the shell (tube) when the shell is upright, H=wave height (peak to trough), L=length of buoy, $K_G$ and $K_T$ are the respective voltage and torque constants of the electro-mechanical (EM) generator, and $r_0$ (in meters of stroke per shaft angular rotation in radians) represents the linear to angular conversion constant of the hydraulic system; and $R_L$ is the value of resistive load.

The parameter $\delta$ is derived directly from the solution of the wave equation and represents the fall-off in pressure in the vertical dimension. If $\delta$ is defined as a fall-off in pressure the results remain general. Here the results are given for a cylinder. Discarding non linear terms from eq. 2 and assuming the buoy stroke length to be small compared to the length, L, of the buoy the parameter $\delta$ is given by $$\delta = (1 - \cosh(2\pi L/\lambda) + \tanh(2\pi D_W/\lambda)\sinh(2\pi L/\lambda)) \quad (3)$$

where:

$\lambda$=to the wavelength of the surface wave; and $D_W$ is the water depth.

For sinusoidal motion, i.e., regular wave, we can switch to complex notation. Defining $F_{IN} \sin(\omega t) = \rho g A H \delta \sin(\omega t)$ as the effective input forcing function caused by the incoming wave on the piston, and the electromechanical coupling constant $K = K_G K_T/r_0^2$, the complex solution for the piston velocity with a resistive load $R_L$ is, $$V_P = F_{IN} R_L/(K(1+j\omega\tau)) = V_{PM}/(1+j\omega\tau) \text{ meters/sec} \quad (4)$$

Where:

$V_{PM} = F_{IN} R_L/K$, $\omega = 2\pi/T$ is the input wave angular frequency, $\tau = R_L C_{EFF}$ and $C_{EFF} = MT/K$ is an equivalent capacitance proportional to the mass of the WEC including the water column in the WEC and "added mass" of surrounding water. For a tall cylinder $C_{EFF}$ is an equivalent capacitance approximately equal to $\rho AL/K = MT/K$.

The recognition that the mass of the WEC including the water column may be characterized as an effective or equivalent capacitance is a significant part of the invention since it provides a basis for calculating the optimum load to be coupled to the system and the value of an inductive element which can be used to resonate with the equivalent capacitance to produce an increase in the transfer of power.

It is seen from (4) that the system dynamics with a resistive load can be represented as a first order low pass filter with a 3 dB point of $\omega_3=1/\tau$. It should be pointed out that all mechanical and electrical parameters can be derived from the solution for piston velocity given in Eq. (4). For a particular system, the corresponding equations for piston stroke $S_P$, power out Pout, and optimum resistive load $(R_L)_{OPT}$ are presented below.

1.1 Stroke:

$$S_P = V_P/j\omega = V_{PM}/(j\omega(1+j\omega\tau)) \text{ meters} \quad (5)$$

Note: only the real part of equation (5) need be considered.

Optimizing Power Extraction

A significant aspect of this invention is to relate electrical power extraction to the buoy system differential equation and to determine the optimum extraction strategy. FIG. 3 shows the equivalent circuit of an electric generator 42 used in FIG. 2A. The electric generator is a 3φ generator located within the buoy. (Voltages shown are RMS values.) In FIG. 3, the only voltages externally available are nodes labeled "A", "B", and "C" as the neutral "N" is not brought out. Because of this, power is extracted by Δ connected loads ($R_L$ in the figure) across the 3 line-to-line voltages ($v_{L-L}=\sqrt{3}v_{L-N}$).

1.2 Electrical Output Power (per leg or $\frac{1}{3}P_T$):

$$P_{OUT} = v_{LL}^2/(2R_L) = K_G^2\omega_S^2/(2R_L) = K_G^2|V_P|^2/(2r_0^2 R_L) = F_{IN}^2 R_L r_0^2/(2K_T^2(1+\omega^2 R_L^2 C_{EFF}^2)) \quad (6)$$

1.3 Optimum Load Resistance:

The optimum load resistance is that value of $R_L$ which maximizes the generator power output $P_{OUT}$. By inspection of Eq. (6), it is seen that $P_{OUT}$ goes to zero at Zero at $R_L=0$ and ∞ and is positive in between so that an optimum does exist By definition, $(R_L)_{OPT}$ is determined by the solution to $\partial(P_{OUT})/\partial(R_L)=0$. Performing this operation on (6) gives, $$(R_L)_{OPT} = 1/(\omega C_{EFF}) \quad (7)$$

The condition (7) is equivalent to $(R_L)_{OPT} C_{EFF}=1/\omega=T/(2\pi)$. Substituting this into (6) yields the result that the output power is approximately proportional to $H^2T$ or the efficiency is constant as long as the load value tracks according to (7). (This ignores, for now, the length degradation factor of Eq.(2) which is independent of $R_L$ but falls off significantly with T.)

Substitution of $(R_L)_{OPT}$ into Eq. (6), gives the maximum power available for a general system as:

$$P_{MAX} = [(\rho g H A \delta)^2 T/(32\pi MT)][Kg/Kt] \quad (8a)$$

for a cylinder $P_{MAX}$ may be expressed as follows:

$$P_{MAX} = \pi g^2 H^2 T A \delta^2/(32\pi L) \quad (8)$$

where $P_{WAVE}$ is the total available power from the wave incident on a buoy of diameter D and length L, i.e., $P_{WAVE} \approx H^2 TD$ (kW).

The electric generator output voltage waveform may be heavily modulated as shown in FIG. 4.

Figure 5:
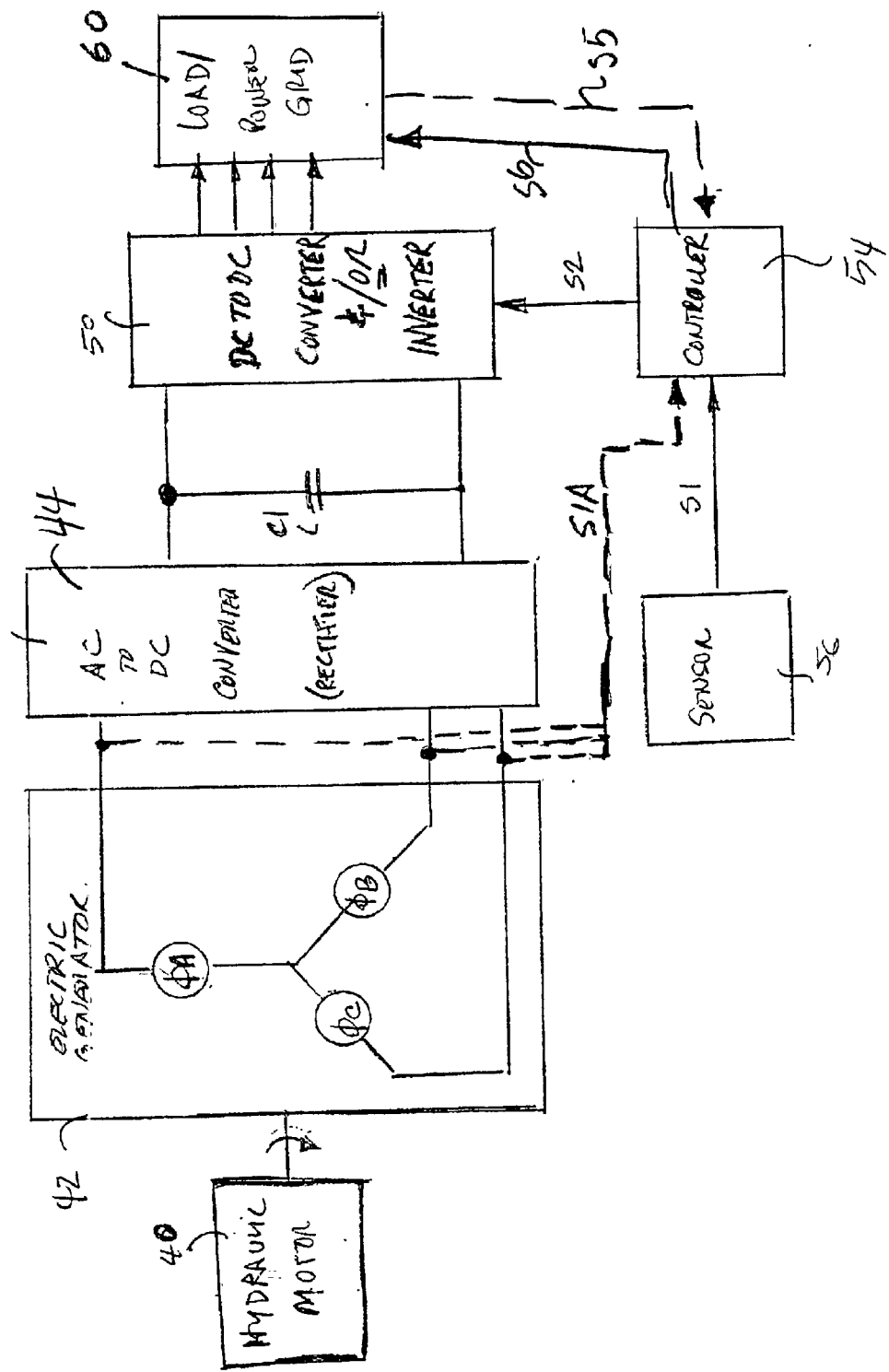
FIG. 5 is a simplified block diagram of part of a system embodying the invention.
Figure 6:
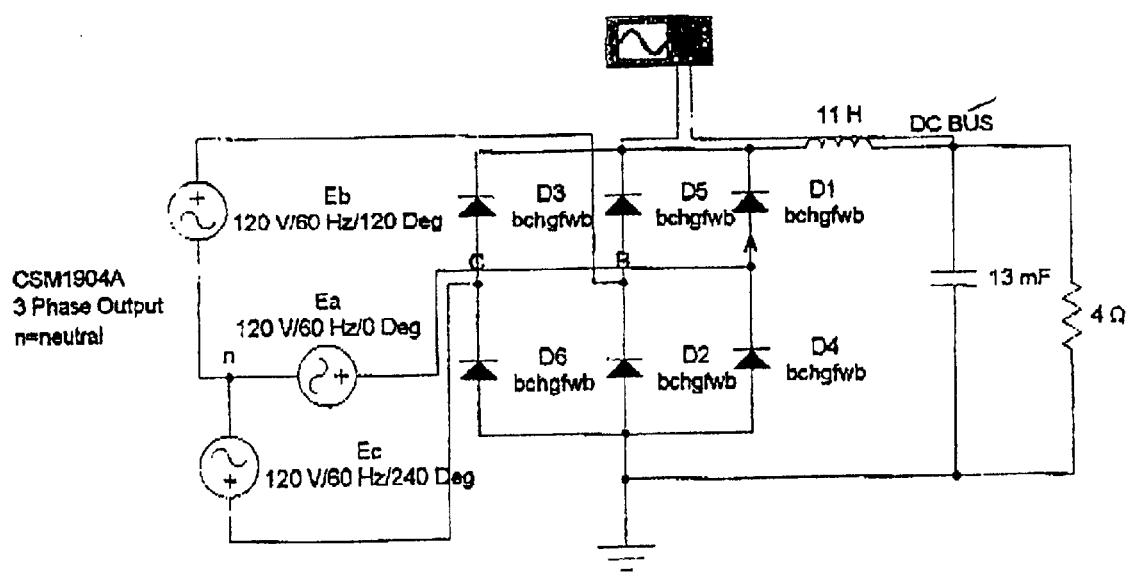
FIG. 6 is a schematic diagram of a rectifier circuit which may be used in systems embodying the invention.

Achieving maximum power transfer requires that the load seen by the generator equals to $(R_L)_{OPT}$. To accomplish this result, a system embodying the invention may be configured as shown in FIG. 5. A hydraulic motor 40 (or any suitable converter) drives an electric generator 42. The output of the electrical generator 42 is supplied to an AC to DC converter 44. The AC to DC converter 44 may be a rectifier circuit of the type shown in FIG. 6. However, it should be appreciated that any suitable AC to DC converter may be used. The output of the AC-to-DC converter is applied across a storage capacitor C1, which in effect stores the energy captured by the WEC from the ocean waves. Where the voltage across C1 would vary significantly, a DC-to-DC converter (e.g., a switching regulator) may be used to provide a more constant DC voltage to inverter 50. The output of the DC-to-DC converter section is then applied to the power inverter section which is coupled at its output to a power grid 60 which is the ultimate load and goal for which the system is intended. Inverter 50 converts the input DC voltage to a single phase or to a multiphase AC signal which is supplied to the power grid and which must meet the requirements of the grid. However, the power grid represents a variable load which, depending on demand, may range over a wide range of values. This variable load is reflected via the converter-inverter 50 across the storage capacitor C1 and back across the output of the AC to DC converter 44 and via the converter 44 to the electrical generator 42.

As noted above, it is important to maintain the impedance seen by the electrical generator close to the value of $R_{LOPT}$. In circuits embodying the invention, the condition of the load may be sensed and a signal S5 may be fed to the controller 54 indicative of the load condition. The value of the load may then be calculated by the controller 54. The value of the load impedance may then be controlled by means of a controller 54 which controls the rate at which the inverter is switched. Alternatively, the controller 54 may be used to directly increase or decrease the value of the load by means of a control signal S6.

At the same time, the power available to be distributed is also variable since it depends on wave energy applied to the WEC, which may vary considerably. By way of example, when there is more power available than is required by the load or when the load decreases below a certain level the controller 54 can (via a signal such as S6) be used to switch in storage batteries or other energy absorbing means which can subsequently be used to provide more (or less) power when load conditions change. The controller 54 is also responsive to a signal, identified as S1, from a sensor 56. The sensor 56 may be any sensor capable of indicating and/or determining the power available from the waves and/or the conditions of the WEC system.

Alternatively, sensor 56 may be any sensor capable of signaling to the controller 54 the amount of power available from the electrical generator 42. The controller 54 is pre-programmed to respond to the sensor 56 generated signals S1 to, in turn, generate a signal, or signals, identified as S2, which is fed to the inverter 50 and which controls how much power can be drawn (taken) from the inverter and supplied to the power grid (i.e., the ultimate load).

In addition (or alternatively), the power (voltage and/or current) being generated by generator 42 may be supplied (see dashed lines S1A in FIG. 5) directly to the controller 54. Controller 54 normally has a much faster response time than the ocean wave or the electrical power signal being generated by the ocean wave. The controller 54 may thus act directly in response to the ocean wave input.

Alternatively, the controller 54 may be pre-programmed and loaded with statistical data as to ocean wave and climate conditions so as to control the system response with a view to optimizing the power transfer. The signals S1 (or S1A) and S2 and the controller action on inverter 50 thus effectively control the value of $R_L$ seen by the generator 42 so that the system is operated such that the effective load is made or kept equal to $R_{LOPT}$. It is significant that, in systems embodying the invention, the available or average input power, as well as the desired optimum load, are factored into the equation to optimize power transfer.

It should be emphasized that a particular rotary hydraulic motor-rotary electrical generator was used for purpose of example and that any other suitable motor generator combination may be used (e.g., a rack and pinion combined with a generator, or a linear electromagnetic generator instead of a hydraulic rotary generator) may be used. Likewise, many different types of converters responsive to naturally recurring sources of energy (for example, a water flow turbine) may be used instead of the WECs shown herein. The cylindrical tube shown in FIGS. 1 and 2A are only for purpose of illustration. The invention may be used in any system including any shell (e.g., container, cylinder, cone) of arbitrary shape suitable for containing a volume of water which in combination with a piston like structure can capture the force of the waves and convert that force to a mechanical motion or force which is then converted to electrical energy.

Figure 5A:
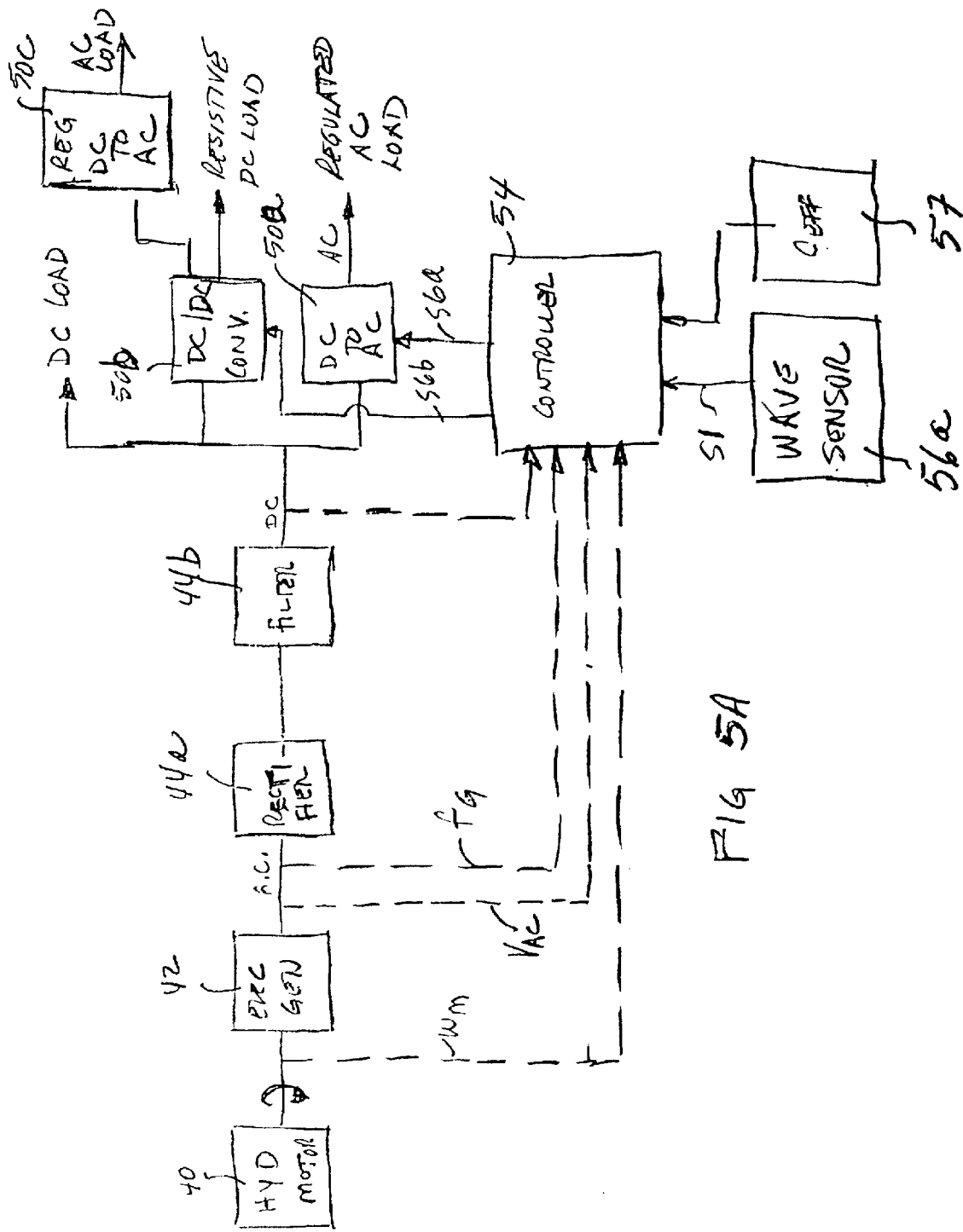
FIG. 5A is another block diagram of a system embodying the invention.

A slightly more detailed and modified version of FIG. 5 is shown in FIG. 5A. FIG. 5A illustrates that the any of the following signals may be applied as inputs to the controller for indicating certain input power or other operating conditions: (a) rotation speed ($\omega$m) of the hydraulic motor 40: (b) The frequency (fG) of the generator 42; (c) the amplitude (VAC) of the generator voltage; and (d) a rectified voltage at the output of a filter 44b. These signals may be in addition to wave sensor signal and other suitable signals (e.g., from CEFF). The controller can then send one or more signals (e.g., S6a, S6b) to a DC-to-AC converter (e.g., an inverter) 50a, a DC-to-DC converter 50b (e.g., a switching regulator) capable of driving a DC load or a regulated DC-to-AC converter (e.g., an inverter) 50c. The controller signals (S6a, S6b) an be used to automatically and/or selectively control the operation of any one of the loads such that the generator 42 "sees" the optimum load, RL (OPT). The controller can also use look up tables preprogrammed into the controller for maintaining RL(OPT); where RL(OPT) is equal to $1/(\omega C_{EFF})$.

Efficiency Improvements with Electrically Resonant Loads:

Applicants recognized that the $M_{WC}$ acceleration term in Eq. (2), above, could be made resonant with an inductive generator load to greatly improve power transfer efficiency. Applicants further demonstrated that each phase of the electrical generator could be loaded with a series resonant circuit and then observed both the electrical and mechanical behavior of the system combination including the WEC, the hydraulic motor and the electric generator. The highly simplified schematic of a particular resonant load is shown in FIG. 7.

Figure 7:
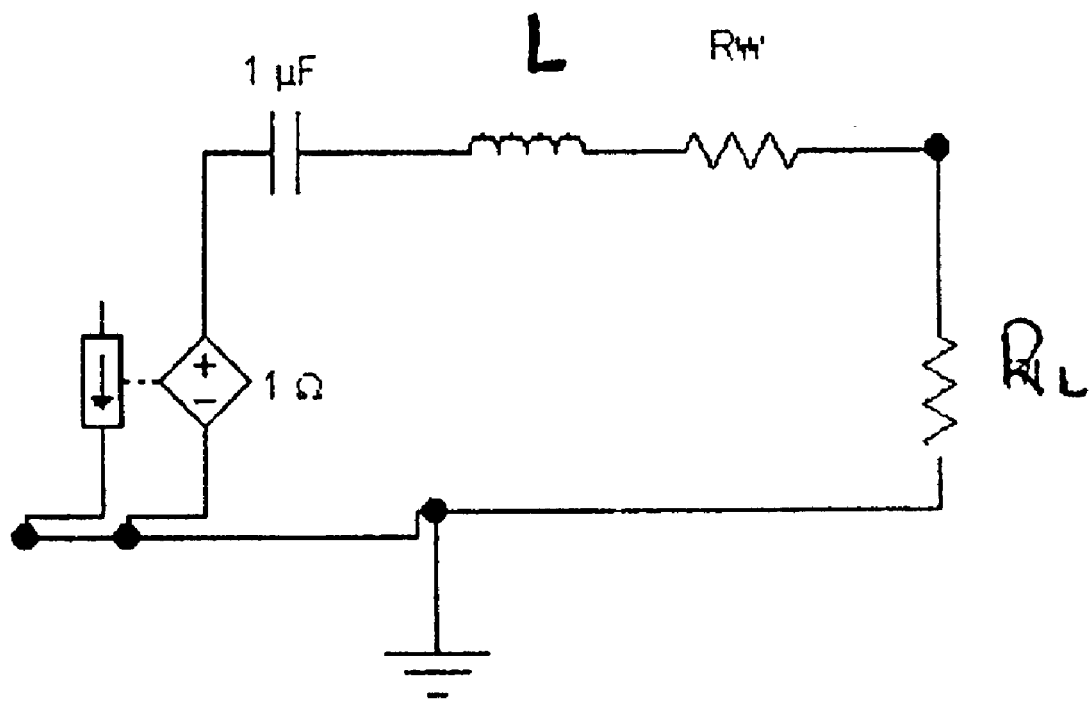
FIG. 7 is a highly simplified diagram of an inductive element used to resonate with a mechanical to electrical converter exhibiting capacitive characteristics.

The electrical resonant frequency of the load circuit shown in FIG. 7 was found to be 48 Hz corresponding to a shaft speed of 16 rps (3 pole pairs in the generator). The electrical output showed a sharp peak at this frequency but, most important, the mechanical torque applied showed the same sharp peak at the same frequency. In other words, electrical load current produces a counter torque in both magnitude and phase! This means that an electrical component in the generator output loop can, indeed, resonate with a mass of water in the WEC and produce power gain by approaching a unity system power factor. The extent of the improvement is further discussed below.

Efficiency Improvement at Resonance

Therefore, another aspect of Applicants' invention relates to apparatus and methods for controlling the output power delivered to a resistive load when it is inductively tuned at, or near, the dominant wave frequency. This modifies the system differential equation (2) and results in a $2^{nd}$ order system in velocity which can be modeled by the electrical equivalent circuit of FIG. 8.

Figure 8:
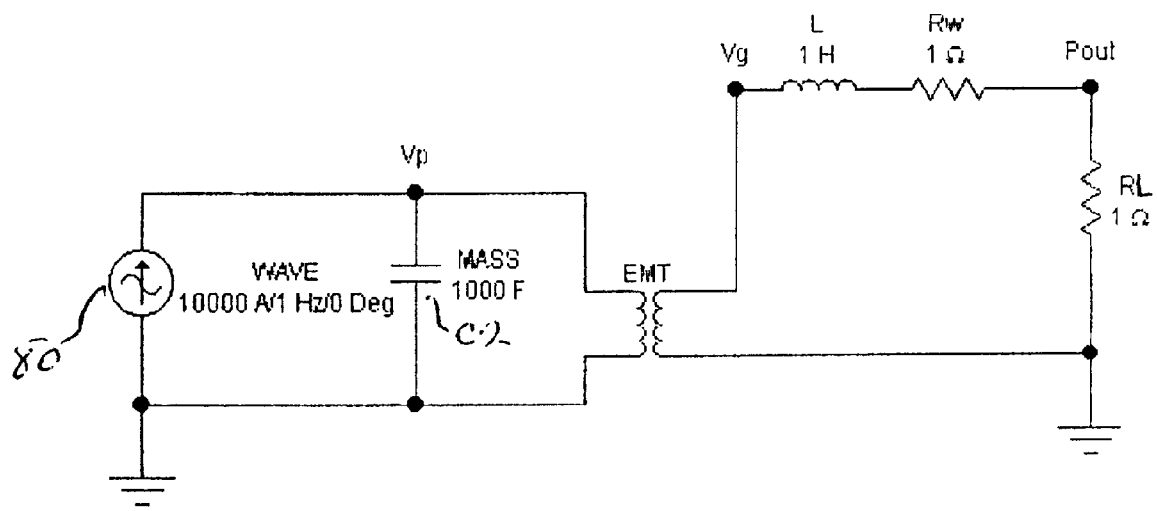
FIG. 8 is an electrical equivalent circuit of a system embodying the invention.

In FIG. 8, the current source 80 represents the force applied to the piston of a buoy by ocean waves (1 A=1 N), the capacitance C2, which is equal to CEFF, is the mass of the water column (1 F=1 Kg) and the EMT is a mythical (but mathematically correct) Electro-Mechanical Transformer which performs the function of translating the linear motion of the WEC into the rotary motion of the generator via the hydraulic system. The power generation capabilities of electrically resonant systems may now be obtained and examined. The output power as a function of input wave power is $$Pout = I_M^2 R_L / ((1-\omega^2 L C_E)^2 + (\omega(R_L+R_W)C_E)^2) \quad (9)$$

where $I_M = k_G K F_{IN} \delta / r_0$ and $F_{IN} = \rho g A H \delta / 2$ are as defined, above, and $C_E$ is equal to $C_{EFF}$.

Figure 9:
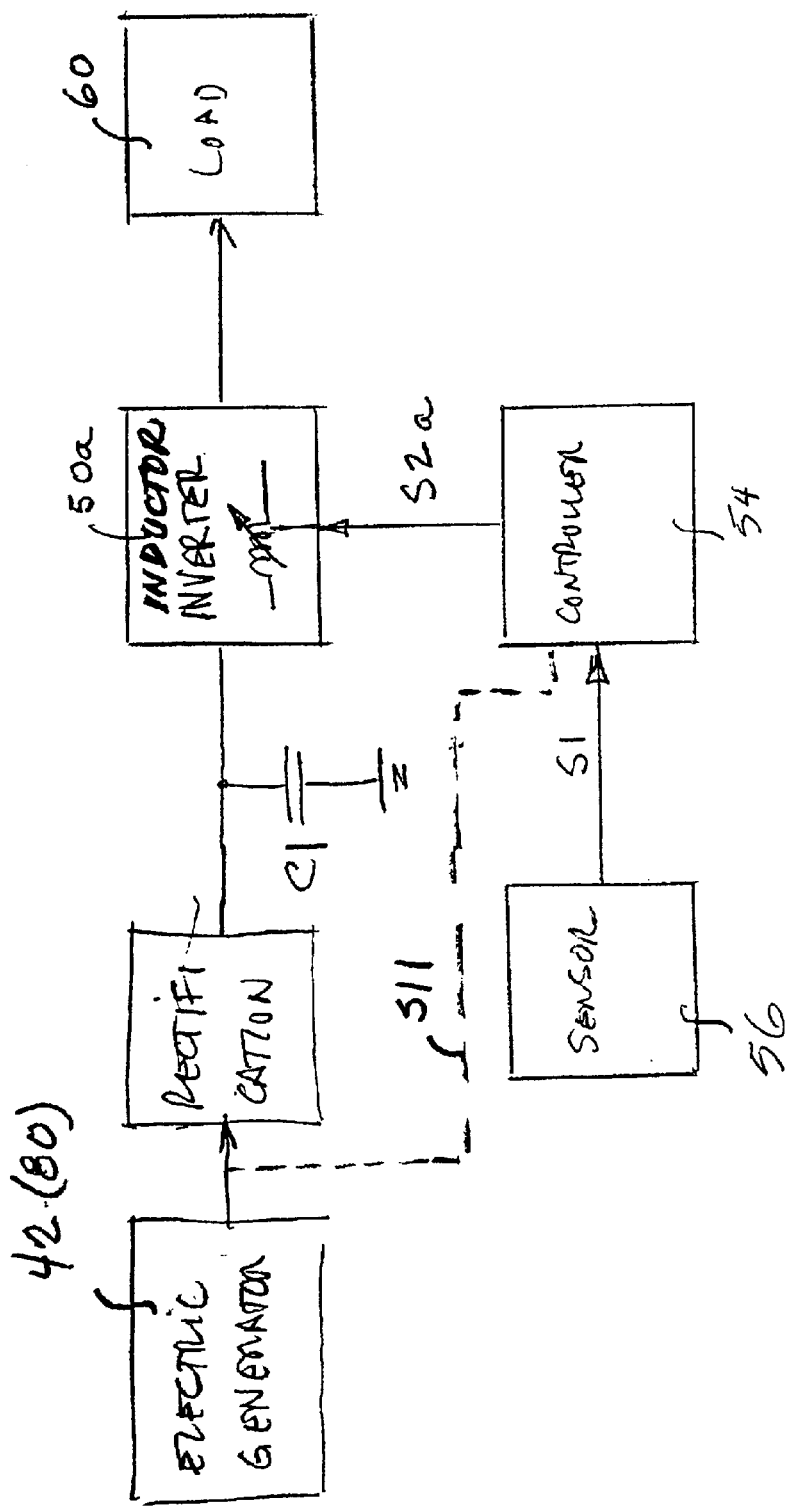
FIG. 9 is a simplified block diagram of a system embodying the invention.

Pout may be computed for different types of buoys and for different wave conditions. In a particular embodiment the inductor L was chosen to resonate with $C_E$ at the peak of the wave period power spectrum. In systems embodying the invention controls may be included to enable the inductor to be continuously varied, as shown in FIG. 9, below. Also, in the embodiment of FIG. 8, $R_L$ was chosen to be equal to the winding resistance, $R_W$, of the inductor which maximizes the power at resonance. The available power $P_{AV}$ and output power $P_{OUT}$ (resistive load) and $P_{RES}$ (resonant load) may then be computed.

FIG. 9 is a simplified diagram of a system in which the controller 54 controls and changes the actual inductance of inductors (in inverter 50a) connected in series with the load 60 (or perform a mathematically equivalent function) to obtain increased output power and efficiency. In response to the sensor signal S1 from sensor 56, controller 54 is preprogrammed to modify an inductance network in inverter 50a, which is similar to inverter 50, but which includes inductors which can be tuned to the load. In this embodiment, as above, the input power may vary as a function of the climate and the load may vary as a function of power demand. However, in both instances, Applicants' invention functions to optimize transfer of power for varying input power conditions and output power demands. That is, a sensor 56 can be used to sense the conditions of the input waves. The controller can be pre-programmed to respond to these conditions on a statistical basis. Alternatively, the controller can respond directly to the input conditions of sensor 56. Still further, the output conditions of the electrical generator can be fed to the controller, as shown by dashed line S11. Since the wave period is very (extremely) long compared to the response time of the controller 54 (which would normally be used), much computation and processing can be performed while the electrical output of the generator is being sensed.

FIG. 9A is a modified version of FIG. 5A showing the placement of an inductive element 500 between the output of the electric generator 42 and the input to the rectifier section 44a. The inductive element 500 may be an inductor having a fixed value, where the fixed value is selected such that $\omega L$ is approximately equal to the average value of $1/(\omega C_{EFF})$. Alternatively, as shown in FIG. 9A, the inductive element 500 may be a variable inductor whose value may be varied by controller 54 as a function of any of the input signals to the controller 54 and/or as a function of any change in the ocean waves causing $C_{EFF}$ to change; with the changes in inductance being such as to maintain $\omega L$ approximately equal to $1/(\omega C_{EFF})$.

Alternatively, as shown in FIG. 9B, the inductive element may comprise a number of different valued discrete inductors with switches controlled by controller 54 for determining the amount of inductance inserted in the circuit between the electric generator 42 and the rectifier 44a.

In accordance with the invention the controller can send control signals to any of a number of different loads (e.g., 60a, 60b, 60c) such that the generator 42 sees RL(OPT). Concurrently, the controller 54 can switch into the circuit the optimum inductance required to achieve resonance as a function of an input (S1) from the wave sensor 56a, or from the CEFF monitor 57 or from any other input to the controller 54. The controller may use a look up function or an algorithm with the frequency of the waves and/or CEFF as independent variables.

Alternatively, the controller 54 can vary the inductance slowly over several wave periods (cycles) during which the system "hunts" for maximum power transfer points. This may be accomplished by periodic computation of power per wave which in turn can make use of a number of different sets of parameters (e.g., Power is equal to voltage times current, or speed times torque, or velocity times force).

Alternatively, the controller may also be used to send signals to an AC to DC converter such that the voltage leads or lags the current and at the same time control the impedance to be approximately equal to RL(OPT). Thus, the effective inductance to resonate with the electromechanical system may be accomplished in a different manner.

Figure 10:
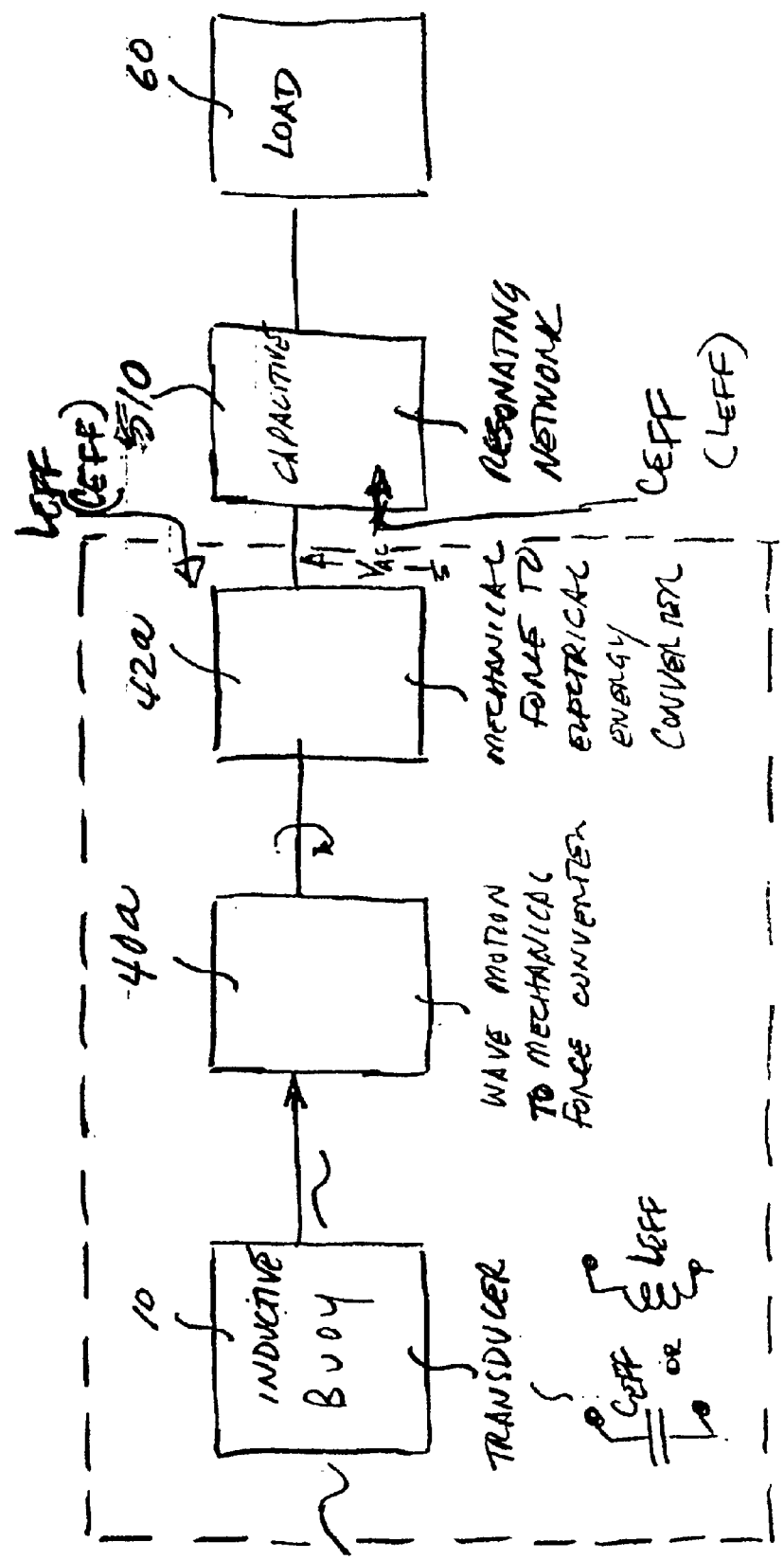
FIG. 10 is a block diagram illustrating that a wave energy converter (WEC) for use in practicing the invention may be either inductive (LEFF) or capacitive (CEFF)

In FIGS. 1 and 2A the equivalent impedance is characterized as being capacitive and equal to $C_{EFF}$. To achieve resonance an inductive element is inserted into the circuit. However, it should be appreciated that the equivalent impedance of a WEC functioning differently than the WECs of FIGS. 1 and 2A may be characterized as being inductive and equal to $L_{EFF}$. For such a WEC, a capacitive component would be inserted in the generator output loop having a value to resonate with $L_{EFF}$. This is shown in a general manner in FIG. 10, where a resonating network 510 is placed in the power transfer loop. If the output impedance of the mechanical force to electrical energy converter 42a is characterized as $\omega L_{EFF}$ then, the resonating network is controlled and made capacitive such $\omega L_{EFF}$ is equal to $1/(\omega C_{EFF})$.

Regarding the piston shown in FIGS. 1 and 2A, note that the piston may be any inner body component such that its movement within a shell (tube) causes a mechanical, electrical or electromechanical response to be generated.

DETAILED DESCRIPTION OF THE INVENTION RELATING TO THE LENGTH OF THE BUOY

As discussed above, a WEC was analyzed and it was shown and taught that there is an optimum value of generator load resistance which maximizes power transfer. The value of the optimum load resistance depends on the geometry of the WEC (buoy) and certain features of the hydraulic system and the type of electric generator. In one embodiment, the electric generator may be a permanent magnet type electric generator which avoids the need to apply power to magnetize. However, it should be understood that any suitable electric generator may be used.

In the discussion above, the focus was on the generator load and its interaction with the effective capacitance of the water mass in the buoy. The concepts and corresponding structures, discussed above, were tested in a wave tank which proved their workability.

The improvement now being considered is the recognition that the length "L" of the buoy (WEC) of the type shown, for example, in FIGS. 1 and 2A, also plays an important role in optimizing power transfer and may be selected to have a value which will increase the efficiency of the system.

The WEC is intended for use in a body of water having a water depth $D_W$, with wave heights of H, and where the waves have a wavelength of $\lambda$. The dynamic pressure field caused by the wave varies with depth, and its effect is quantified by the parameter $\delta$. The parameter $\delta$ is a variable that increases monotonically with depth, and varies with L, $D_W$, $\lambda$, and the shape of the buoy. Applicants' invention resides, in part, in the discovery that there is an optimal length L of the tubular structure as discussed below.

More specifically, the invention includes the recognition that there is an optimal length "L" of the buoy (WEC) that will produce the most power for a given input wave. This optimal length is a solution to the equation:

$$L=\delta/(2\delta') \qquad \text{eq. 10}$$

where $\delta'$ is the derivative of $\delta$ with respect to L.
In the case of a cylindrically shaped buoy, as set forth for eq. 3, above which is reproduced below:

$$\delta=1-\cosh(2\pi L/\lambda)+\tanh(2\pi D_W/\lambda)\sinh(2\pi L/\lambda) \qquad \text{eq. 3}$$

and $$\delta'=(2\pi/\lambda)\sinh(2\pi L/\lambda)+(2\pi/\lambda)\tanh(2\pi D_W/\lambda)\cosh(2\pi L/\lambda) \qquad \text{eq. 12}$$

so that $$L = \frac{1 - \cosh(2\pi L/\lambda) + \tanh(2\pi D_w/\lambda)\sinh(2\pi L/\lambda)}{(4\pi/\lambda)\sinh(2\pi L/\lambda) + (4\pi/\lambda)\tanh(2\pi D_w/\lambda)\cosh(2\pi L/\lambda)} \qquad \text{eq. 13}$$

where: $D_W$=water depth; and $\lambda$ is a solution to the equation $$\lambda=(gT^2/2\pi)\tan(2\pi D_W/\lambda) \text{ with } T=\text{wave period and } f=1/T. \qquad \text{eq. 13a}$$

Note that the equation for "L" may be solved empirically. The parameter $\delta$ is a monotonically increasing function of depth, and expresses the effective pressure applied to the WEC for finite value of length "L" for a water depth of "Dw".

The dynamic pressure field caused by the surface waves varies with depth (i.e., the dynamic pressure decreases exponentially as the depth increases), and its effect is quantified by the parameter $\delta$. Applicants discovered that there is an optimal length L for the tubular structure, shown in the figures, which may be expressed as a function of $\delta$. The equation for $\delta$ is derived directly from the solution of the wave equation with the only boundary condition at the bottom of the body of water in which the WEC (buoy) is located, where the flow is set to zero.

Specifically, the invention includes the recognition that there is an optimal value for the length of the tubular structure of the WEC which will produce the most power for a wave of given period and a body of water of given depth (Dw).

That there is an optimal length, L, and the effect of varying the length may also be demonstrated by deriving an expression for the power output (Pout) of the system as a function of the length, L, of the tubular structure (buoy or WEC). Equations 1 and 2, above, indicate that the input force (Fin) from the waves applied to the buoy may be expressed as follows:

$$Fin=\rho gA\delta H/2 \qquad \text{eq. 14}$$

Where $\rho$ is the density of the mass within the shell of the buoy, g is gravity, A is the cross sectional area of the buoy when projected onto a plane parallel to the surface of the water; H is the wave height peak to trough; and δ is as defined above.

Since δ increases monotonically as a function of L, so does the force (Fin) on the buoy due to the surface waves. Thus, the force on the buoy caused by the waves increases monotonically with depth. Referring to equation 8a above it may be seen that power output increases with force, since eq. 8a can be rewritten as:

$$P_{MAX}=[(\pi gHA\delta)^2T/(32\pi M_T)][K_g/K_t]=[F_{IN}^2T/(8\pi M_T)][K_g/K_t]$$

Since $K_g/K_t$ is a constant which accounts for losses in the generator system and can be approximated as $K_g/K_t \approx 1$, the equation becomes $$P_{MAX}=F_{IN}^2T/(8\pi M_T)$$

This equation at first glance suggests that if $F_{IN}$ increases with depth, $P_{MAX}$ increases with depth. However, this is not the case, because $M_T$ also increases with depth. Because δ can be nonlinear, $F_{IN}$ does not always increase linearly with depth like $M_T$ does. The result is that even though $P_{MAX}$ is an expression for the maximum power outputted from an optimized load, $P_{MAX}$ itself can be further optimized by choosing the optimum length. This optimum occurs when L=δ/(2δ'). Solving this equation, in which L appears on both the left and the right sides of the equation (in the δ term), can be done empirically.

Figure 11:
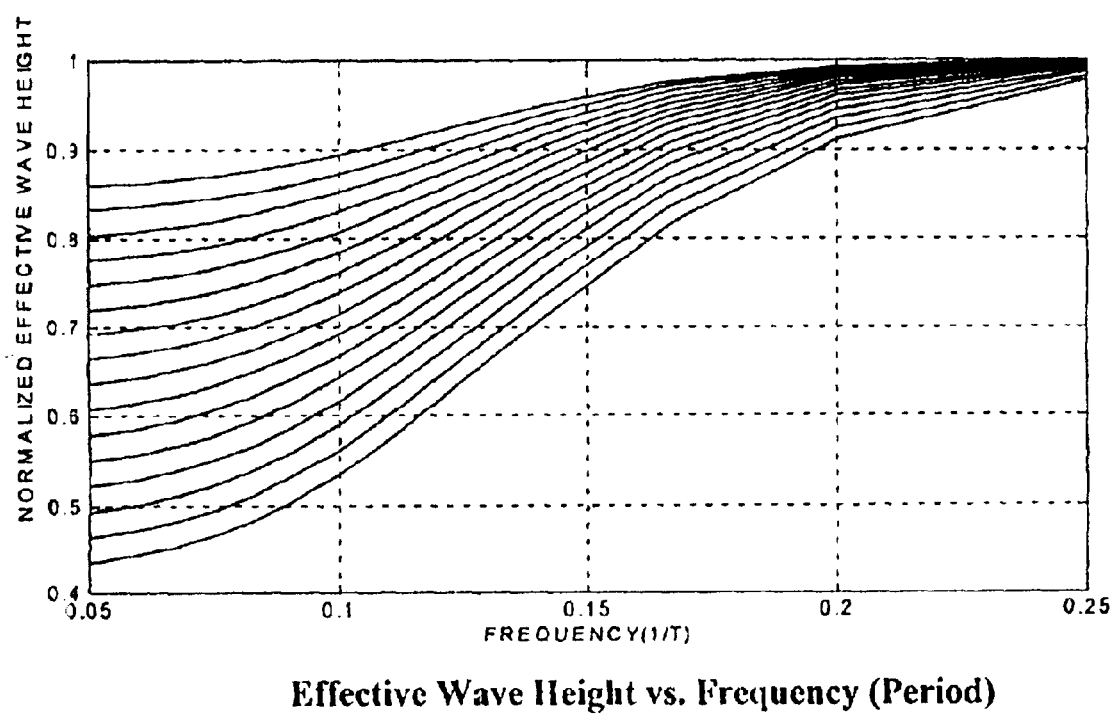
FIG. 11 is a plot of normalized effective wave height versus frequency.

On the strength of FIG. 11 alone, the buoy should be made as long as possible, because it seems that the power captured increases as the length of the buoy increases. That is, since delta, δ, gets continually bigger and increasingly closer to one as the Depth of the water Dw increases, one would think that it would be desirable to have the longest buoy possible to capture the most of the available power. This occurs in FIG. 11 because as the length of the buoy is made equal to Dw, δ comes closer to one (1). This is reinforced by the view that Pout is a function of the input Force which varies as delta squared. Thus, one would conclude that Pout gets continually bigger as delta gets bigger. However, this view ignores the effect of $M_T$ increasing. The problem with increasing $M_T$ is not evident from FIG. 11.

Thus, in the past, the buoy was always made as long as possible for a given water depth, Dw. But, Applicants discovered that this should not be the case. The reason is that the efficiency of the power transfer falls (decreases) when the length "L" of the buoy increases above a certain optimum level due to the increased mass of the water that the WEC has to move.

The power output obtainable for the system may be expressed as per equation 8. That is:

$$Pout=P_{MAX}=\rho g^2H^2TA\delta^2/(32\pi L) \qquad \text{Eq. 8}$$

Note that the term $P_{MAX}$ as used here is basically equal to the power output (Pout) from the WEC for values of $R_L$ optimum; but, this value of $P_{MAX}$ may be further optimized as a function of the length "L" of the buoy. That is, with respect to eq. 8, assuming operation at the optimum $R_L$, the power output and the efficiency of the system can be varied by varying the length L of the tubular section. The point is that there is an optimum $R_L$ for a given L; and an optimum L for a given Dw and λ.

Figure 12:
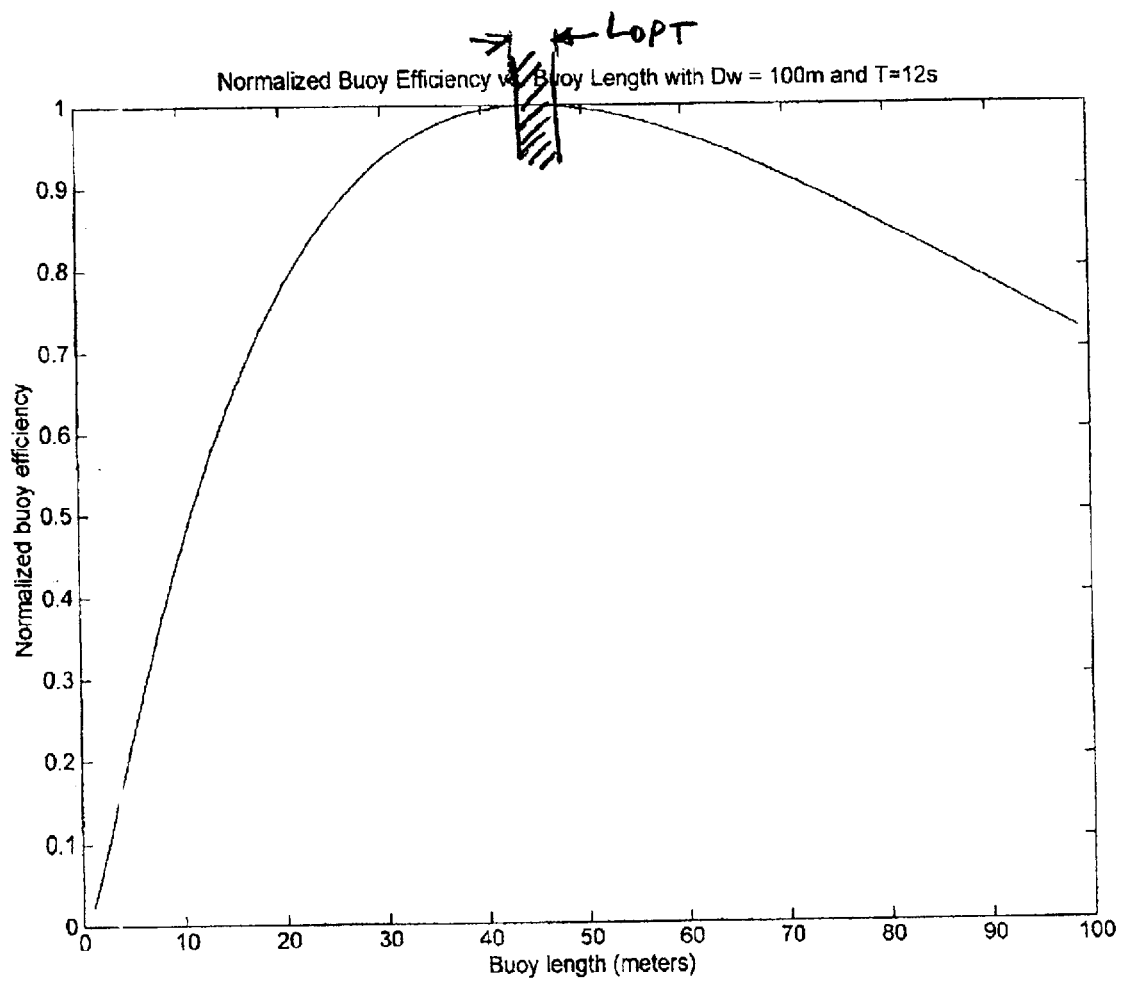
FIG. 12 is a plot of normalized buoy efficiency as a function of buoy length.

FIG. 12 shows a graph of a normalized buoy efficiency versus the length (L) of a buoy in a body of water having a depth (Dw) of 100 meters with waves having a period of 12 seconds. Note that the power output increases as the length of the buoy is increased until a maximum is reached when the length of the buoy reaches an optimum value (e.g., about 42 to 47 meters for the particular example). As the length of the buoy increases beyond the optimum value the power output decreases. Note also that the peak of the curve is relatively shallow. Thus, in FIG. 12 the length of the buoy may be made as short as approximately 28 meters and still result in a 90% efficiency level. Likewise, the length of the buoy may exceed 80 meters before the efficiency decreases below 90%. This finding is significant in that it demonstrates that unless it is important to operate the WEC at the maximum (e.g., 100%) possible efficiency levels, the buoy may be operated at lower efficiency levels (e.g., 90%) by making the buoy shorter to obtain savings in the cost of manufacturing a shorter buoy and/or one that is easier to carry and position.

Figure 13:
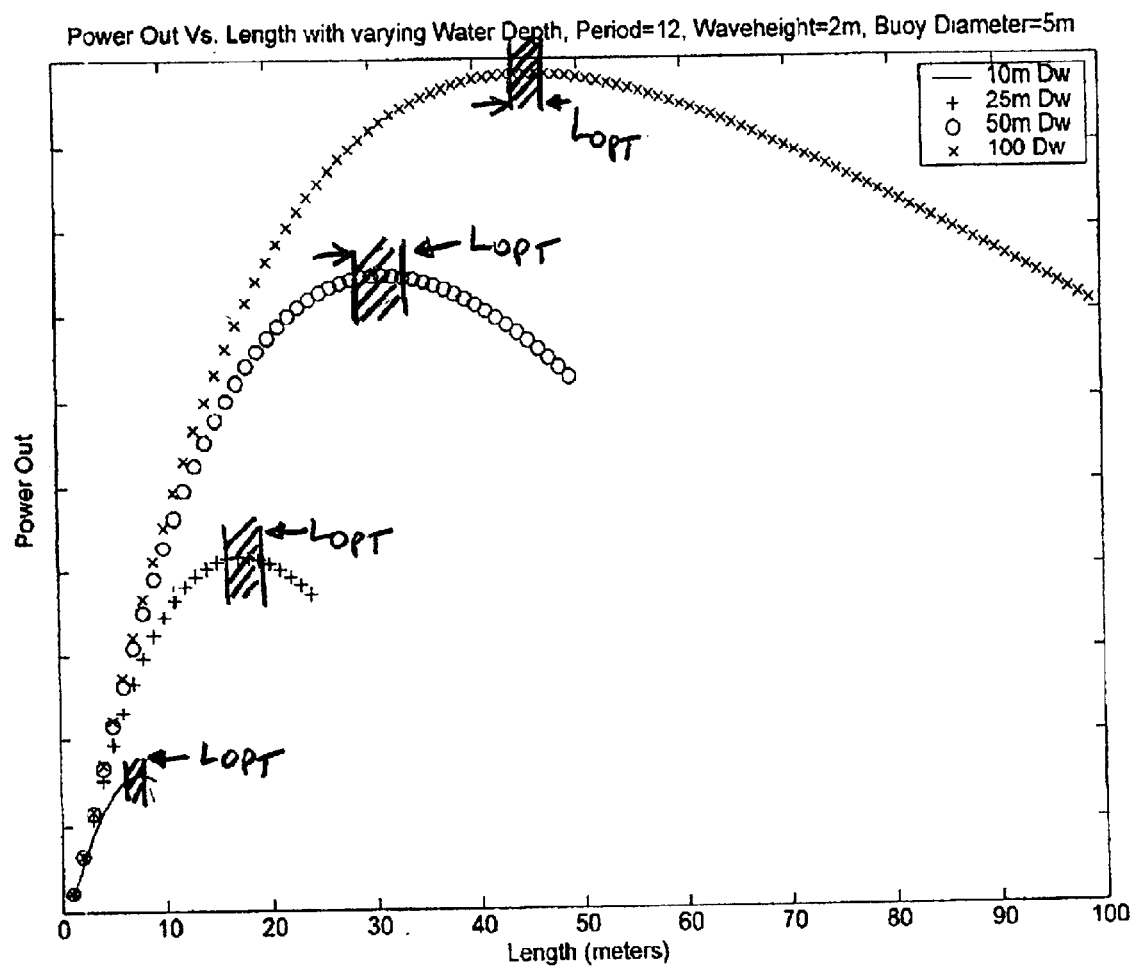
FIG. 13 is a plot of normalized values of Power Out for different values of buoy lengths.
Figure 14:
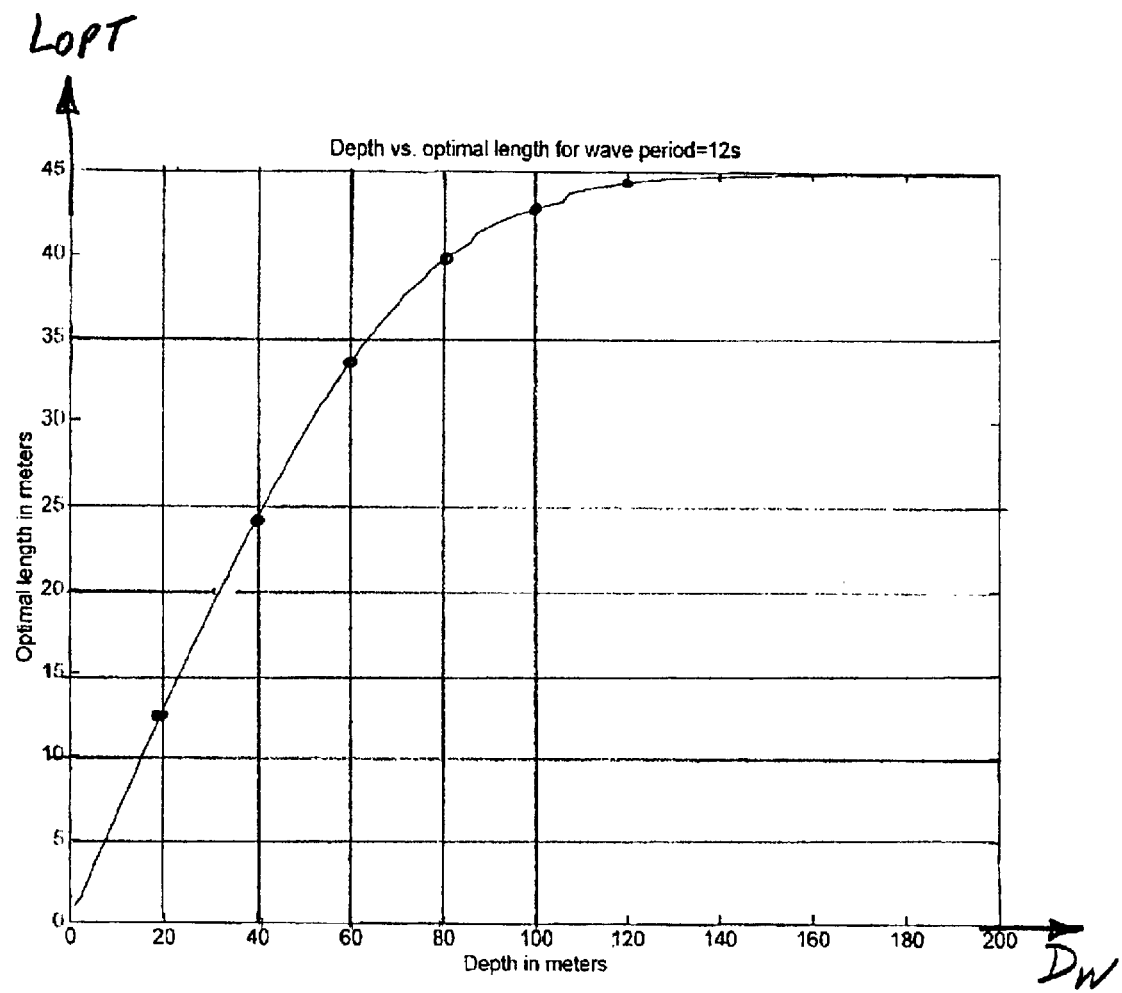
FIG. 14 is a plot of optimal length of a buoy as a function of different water depths.

To further illustrate how the power output varies as a function of the length of the buoy reference is made to FIG. 13. Note that there are different optimal values of length for different water depths. The general response is the same in all instances. However, for shallow water (e.g. where Dw/λ<⅓) the optimal length of the buoy is in the range of 0.6 to 0.8 times the depth Dw. For bodies of water which have greater depth (e.g. Dw/λ>⅓), the optimal length of the buoy is a smaller ratio of Dw; e.g., 0.4 to 0.5 of Dw for Dw equal to 100 meters. This feature is even better shown in FIG. 14 which shows the variation of Loptimal as a function of depth, Dw. Note that for small values of Dw (e.g., for waves with periods of 12 seconds and Dw less than 80 meters), Loptimal increases almost linearly as a function of increasing Dw. However, as Dw increases above a certain value (e.g., 100 meters) Lopt goes to a fixed value (e.g., approximately 45 meters). Thus, for the example of FIG. 14 (i.e., with T=12 seconds) for any Dw, greater than 200 meters, there is no further advantage (e.g., gain in power output) in making L greater than the Loptimal (e.g., 45 meters).

The equation for $P_{MAX}$ may be manipulated to derive an equation for the system power conversion efficiency (η) as follows:

$$\eta \propto \delta^2 D/L \qquad \text{Eq. 15}$$

Where δ is defined in Equation 3, above, and as shown in FIG. 11, L is the length of the buoy and D is the diameter of the buoy (assuming a cylindrical structure). An examination of equation 15 indicates that the length "L" in the denominator is a term which limits the desirability of using an arbitrarily long WEC, as suggested by FIG. 11 and as is the common practice. However, equation 15 indicates that the power output form a buoy may be increased by increasing the diameter of the buoy.

As already discussed above, Applicants recognized that the decrease in efficiency is physically caused by the disproportionate increase in water mass which the WEC must handle with increasing length of the WEC in order to get the same gains in the pressure field. Applicants further recognized that there is an optimum length "L", which may be determined. Computer simulations, as discussed above, have been run which show this feature. But, what is most important here is the nature of the optimum. To illustrate, assume that Dw goes to infinity (Dw→∞) and L goes to infinity so that $\delta^2$ goes to $[1-\exp(-2\pi L/\lambda)]^2$ and therefore the function of η to be maximized is that which equals $\delta_2/L$.

Figure 15:
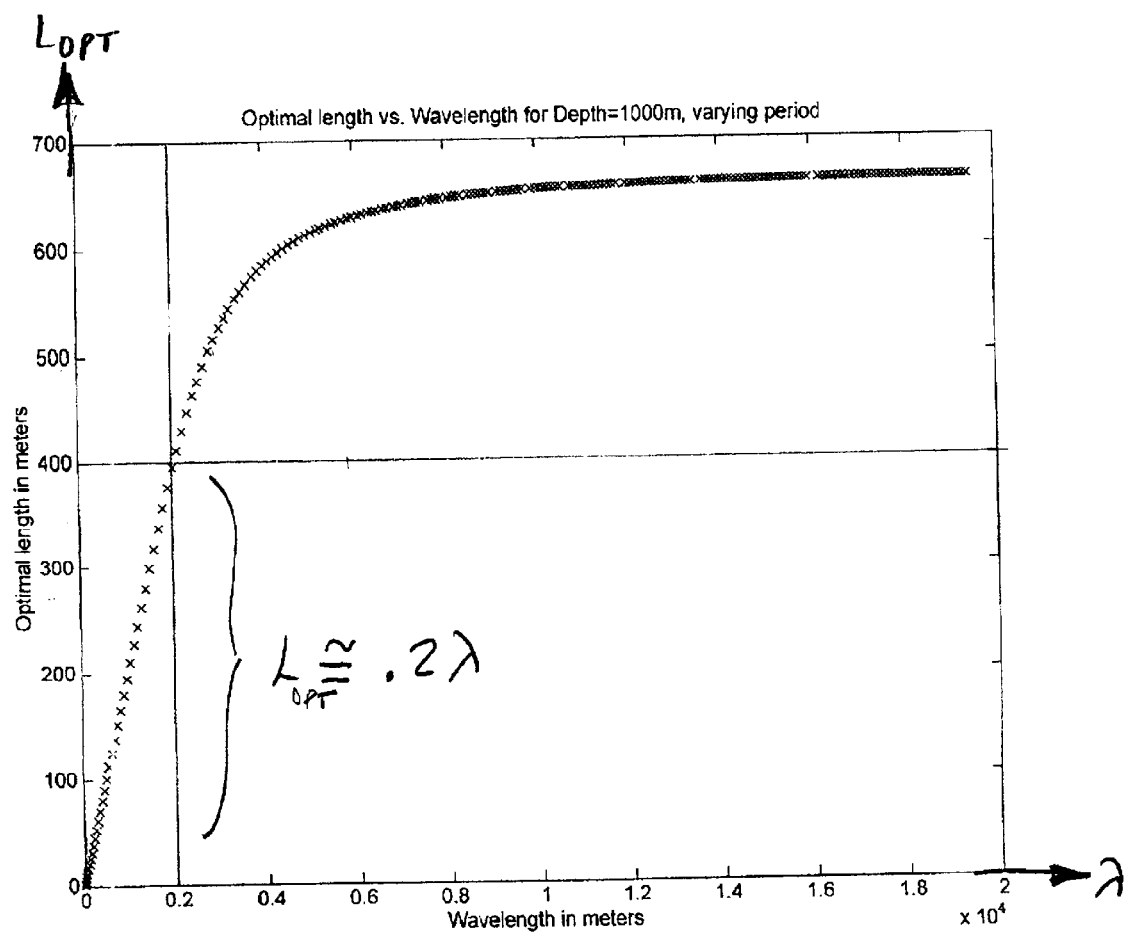
FIG. 15 is a plot of the optimal length of the buoy as a function of wavelength, $\lambda$.

Applying mathematical rules to optimize the results yields, in the case of "deep water," an optimum value for the length Loptimal of the buoy which is approximately equal to 0.2λ. This is an important and new result and it suggests a change in the manner in which the length of the buoy (WEC)

should be determined. This finding may be illustrated by reference to FIG. 15 which illustrates that for "deep water" conditions, where "deep water" is defined as any condition for which $D_w/\lambda > \frac{1}{3}$, Loptimal is approximately equal to $0.2\lambda$. Thus, for "deep water" conditions Loptimal may be set approximately equal to $0.2\lambda$. For shallow water conditions Loptimal is a more complex function of Dw and $\lambda$.

By way of example, at Portland, the peak of the wave spectrum occurs at 12 seconds corresponding to a $\lambda$ of 225 meters and Loptimal of 45 meters. This tends to lower the efficiency calculated from equation x above, but the efficiency can be increased without affecting the optimum length of the buoy by increasing the buoy diameter. For example, the buoy diameter can be made 50 or 60 meters. This would result in a stubby WEC where both length and the diameter would be approximately equal to $0.2\lambda$. Simulating the performance of such a large WEC indicates that the output power could be in the range of 1 Megawatt. This represents a significant improvement over the prior art.

Equation 15 predicts that the capture efficiency increases without limit as the diameter "D" of the buoy is increased. The WEC energy capture depends on the solution of the wave equation with a very complex boundary condition and to date this has not been solved. Beyond a certain diameter size, the water would encircle the WEC and the response of the system is not well defined.

Note that a buoy may be designed for a known location whose characteristics are known. That is, the depth of the water (Dw) at a selected site will generally be known and or is ascertainable. Likewise, the shape and frequency of the waves (e.g., T, $\lambda$ and H) at the site may be statistically known and/or determined. This enables the selection of an optimal value for the length of the buoy to be put in operation at the site.

It has been demonstrated that the optimal value of L, obtained as discussed above, yields the most power that can be mechanically extracted from the waves.

What is claimed is:

1. A wave energy converter (WEC) comprising:
   a shell mounted about a piston forming a combination which when placed in a body of water is responsive to waves in the body of water for producing relative motion between the shell and the piston;
   a mechanical motion to electrical energy converter, including an electric generator, responsive to the relative motion between the shell and the piston for producing electrical power at an output of the electric generator;
   means coupling a load to the output of the electric generator; wherein the shell has a length, L, and the electric power produced at the output of the electric generator is a function of the length of the shell and the depth (Dw) of the body of water in which the WEC is placed; and wherein, as the length of the shell increases from zero to a value equal to Dw, the electric power produced at the output of the generator increases to a maximum value and then decreases; and wherein the length of the, shell is selected to produce at least a predetermined power output for certain conditions of the waves.

2. The WEC as claimed in claim 1, wherein the length of the shell is selected to be no less than 0.3 Dw and no greater than 0.7 Dw.

3. The WEC as claimed in claim 1, wherein the optimum length, L, of the shell is determined by empirically solving the following equation:

$$L = \frac{1 - \cosh(2\pi L/\lambda) + \tanh(2\pi D_w/\lambda)\sinh(2\pi L/\lambda)}{(4\pi/\lambda)\sinh(2\pi L/\lambda) + (4\pi/\lambda)\tanh(2\pi D_w/\lambda)\cosh(2\pi L/\lambda)}$$

where:
$D_w$=water depth; and
$\lambda$ is a solution to the equation $\lambda=(gT^2/2\pi)\tan(2\pi D_w/\lambda)$.

4. The WEC as claimed in claim 1 wherein the optimum length (L) of the shell is determined by solving the following equation for values of L ranging from zero to Dw:

$$P_{MAX}=\rho g^2 H^2 TA\ \delta^2/(32\pi L)$$

Where:
$\rho$=is the density of the mass within the shell of the buoy;
g=gravity;
H=to the wave height peak to trough;
T=period of wave;
A=the area of the buoy normal to the surface of the water; and
$\delta=1-\cosh(2\pi L/\lambda)+\tanh(2\pi D_w \lambda)\sinh(2\pi L/\lambda)$.

5. The WEC as claimed in claim 1, wherein the length of the shell has a value approximately equal to the value of L for which maximum output power is obtained.

6. A wave energy converter (WEC) comprising:
   a shell mounted about a piston forming a combination which when placed in a body of water is responsive to waves in the body of water for producing relative motion between the shell and the piston;
   a mechanical motion to electrical energy converter, including an electric generator, responsive to the relative motion between the shell and the piston for producing electrical power at an output of the electric generator;
   means coupling a load to the output of the electric generator, said load having an impedance whose value is a function of the period of the waves and of the mass of the water in the shell; and
   wherein the shell has a length, L, and wherein the electric power produced at the output of the electric generator is a function of the length of the shell and the depth (Dw) of the body of water in which the WEC is placed; and wherein, as the length of the shell increases from zero to a value equal to Dw, the electric power produced at the output of the generator increases to a maximum value and then decreases; and wherein the length of the shell may be selected to produce at least a predetermined power output for certain conditions of the waves.

7. The WEC as claimed in claim 6, wherein the length of the shell is selected to be no less than 0.30 Dw and no greater than 0.70 Dw.

8. The WEC as claimed in claim 6, wherein the optimum length of the shell is determined by empirically solving the following equation:

$$L = \frac{1 - \cosh(2\pi L/\lambda) + \tanh(2\pi D_w/\lambda)\sinh(2\pi L/\lambda)}{(4\pi/\lambda)\sinh(2\pi L/\lambda) + (4\pi/\lambda)\tanh(2\pi D_w/\lambda)\cosh(2\pi L/\lambda)}$$

where:
$D_w$=water depth; and
$\lambda$ is a solution to the equation $\lambda=(gT^2/2\pi)\tan(2\pi D_w/\lambda)$.

9. The WEC as claimed in claim 6, wherein the optimum length (L) of the shell is determined by solving the following equation for values of L ranging from zero to Dw:

$$P_{MAX}=\rho g^2 H^2 TA\ \delta^2/(32\pi L)$$

Where:
ρ=is the density of the mass within the shell of the buoy;
g=gravity;
H to the wave height peak to trough;
T=period of wave;
A=the area of the buoy normal to the surface of the water; and
δ=1−cosh(2πL/λ)+tanh(2πD$_w$/λ)sinh(2πL/λ).

10. A WEC as claimed in claim 6, wherein the impedance of said load is approximately equal to 1/(ω)(C$_E$) for optimizing the generator power output; where:
ω is equal to the angular frequency of the waves expressible as 2π/T where T is the period of the waves; and
C$_E$ is approximately equal to MT/K where MT is approximately equal to the mass of the shell and the mass of the water moved by the shell and K is an electromechanical coupling constant.

11. A WEC as claimed in claim 6, wherein one of the shell and the piston is relatively stationary and the other one of said shell and piston moves in response to said waves.

12. A WEC as claimed in claim 6, wherein the mechanical motion to electrical converter includes a motor which is responsive to mechanical forces due to said relative motion between the shell and the piston for driving the electric generator and producing electrical energy proportional to said relative motion, which electrical energy is applied to said load.

13. A WEC as claimed in claim 6, wherein said load is primarily resistive.

14. A WEC as claimed in claim 9 wherein the portion of the WEC producing a voltage at the output of the electric generator exhibits one of an inductive and capacitive reactance, and wherein said means coupling the load to the output of the electric generator includes a reactive element exhibiting the other one of an inductive and capacitive reactance for enhancing the generation of a resonant condition in the power generation of the WEC.

15. A WEC as claimed in claim 10 wherein the equivalent impedance of the shell and piston and the mechanical motion to electrical energy converter is primarily capacitive and wherein the reactive element coupling the load to the output of the converter includes an inductive element (L) whose reactance (ωL) is approximately equal to the reactance [1/(ω)(C$_E$)] exhibited at the output of the electric generator for enhancing the generation at a resonant condition.

16. A WEC as claimed in claim 6, wherein the shell has a tubular shape and the piston moves, up and down within the tubular enclosure.

17. A WEC as claimed in claim 6, further including a controller for varying the impedance of the load for maintaining the value of the load seen by the generator equal to an optimum value (RLOPT) for optimum power transfer.

18. A WEC as claimed in claim 6, further including a controller for varying the inductive element for maintaining the system in resonance as a function of changes in at least one of the amplitude, frequency and phase of the waves.

19. A WEC as claimed in claim 6, wherein said inductive element includes at least two different inductive components switchably interconnected to selectively increase or decrease the inductance in the power loop.

20. A WEC as claimed in claim 6, further including a sensor for sensing at least one of the conditions of the waves and the status of the WEC system and a controller responsive to signals from the sensor for varying the values of at least one of the load and the inductive element for maintaining an optimum value of load and enhancing resonance of the system.

21. A wave energy converter (WEC) comprising:
a shell mounted about a piston forming a combination which when placed in a body of water is responsive to waves in the body of water for producing relative motion between the shell and the piston;
a mechanical motion to electrical energy converter, including an electric generator, responsive to the relative motion between the shell and the piston for producing electrical power at an output of the electric generator;
means coupling a load to the output of the electric generator; and
wherein when the body of water has a depth, Dw, and the wavelength, λ, of the waves may be expressed as λ=(gT²/2π) tan(2πD$_w$/λ) and where Dw/λ is greater than ⅓, then the length of the shell is made equal to Kλ; where K is a constant less than 1.

22. The wave energy converter as claimed in claim 21, wherein K is equal to 0.2.

23. A method for selecting the length of a tubular shell of a wave energy converter (WEC) to be used in a system, where the tubular shell is mounted about a piston and forms a combination therewith which when placed in a body of water is responsive to waves in the body of water for producing relative motion between the tubular shell and the piston and where the WEC includes a mechanical motion to electrical energy converter, including an electric generator, responsive to the relative motion between the shell and the piston for producing electrical power at an output of the electric generator, comprising the steps of:
(a) determining the values of power output for
P=ρg²H²TA δ²/(32πL) as a function of L, where L is the length of the tubular shell, and
Where:
ρ=is the density of the mass within the shell of the buoy;
g=gravity;
H=to the wave height peak to trough;
T=period of wave;
A=the area of the buoy normal to the surface of the water; and
δ=1−cosh(2πL/λ)+tanh(2πD$_w$/λ)sinh(2πL/λ); and
(b) selecting the value of L providing the best results in view of the power generated and cost of the system.

24. A method for selecting the length of a tubular shell of a wave energy converter (WEC) to be used in a system, where the tubular shell is mounted about a piston and forms a combination therewith which when placed in a body of water is responsive to waves in the body of water for producing relative motion between the tubular shell and the piston and where the WEC includes a mechanical motion to electrical energy converter, including an electric generator, responsive to the relative motion between the shell and the piston for producing electrical power at an output of the electric generator, comprising the steps of:
(a) calculating the different values of L as a function of λ and Dw, where $$L = \frac{1 - \cosh(2\pi L/\lambda) + \tanh(2\pi D_w/\lambda)\sinh(2\pi L/\lambda)}{(4\pi/\lambda)\sinh(2\pi L/\lambda) + (4\pi/\lambda)\tanh(2\pi D_w/\lambda)\cosh(2\pi L/\lambda)}$$

and where:
D$_w$=water depth; and
λ is a solution to the equation λ=(gT²/2π)tan(2πD$_w$/λ).

* * * * *